UNITED STATES PATENT OFFICE.

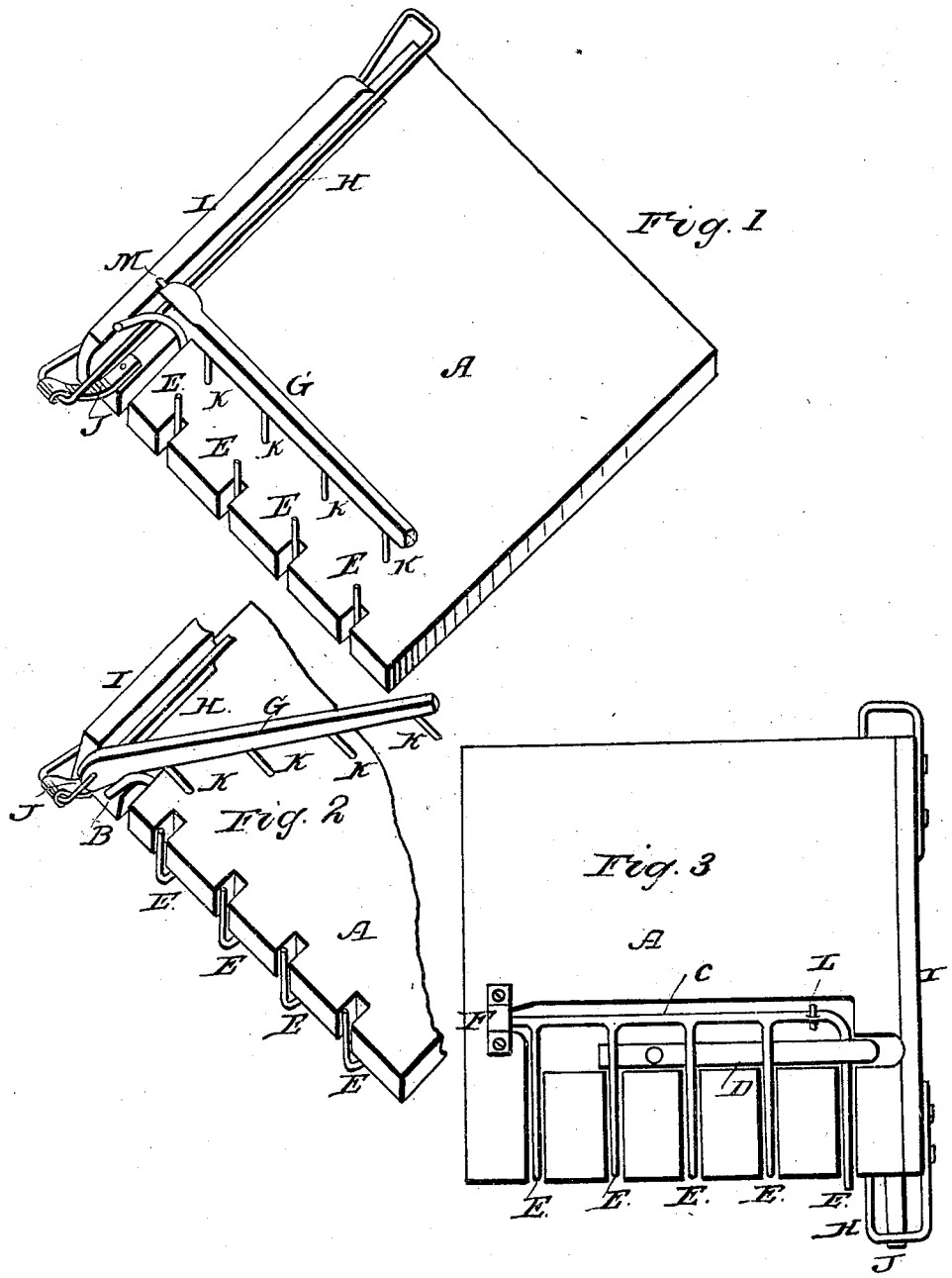

JAMES B. BOWEN, CHARLES A. WHELAN, AND CLEANTHUS A. REED, OF MADISON, WISCONSIN.

IMPROVEMENT IN HARVESTER-RAKES.

Specification forming part of Letters Patent No. 92,783, dated July 20, 1869.

*To all whom it may concern:*

Be it known that we, JAMES B. BOWEN, CHARLES A. WHELAN, and CLEANTHUS A. REED, of Madison, in the county of Dane and State of Wisconsin, have invented a new and useful machine for compressing grain into a suitable bundle upon the platform of a reaper before being discharged from the same; and we do hereby declare that the following is a full, clear, and exact description of the construction and operation of the same, reference being had to the annexed drawings, making a part of this specification, in which—

Figure 1 is a perspective view, showing the compressor while holding the grain in its position before being operated upon by the rake. Fig. 2 is a perspective view, showing the position of the compressor immediately after the grain is discharged. Fig. 3 is a plan from the lower side.

The nature of our machine consists in providing an attachment upon the platform of a grain-harvester for holding and compressing the grain into a bundle while the same is being raked and previous to being discharged from the platform.

To construct our machine, we lay a metal bar, C, transversely across that portion of the bottom surface of the harvester-platform which corresponds with the course of the harvester-rake, upon the upper surface of the platform, the front end forming a journal, placed in its box F.

Into the bar C are fitted metal teeth E E E E, corresponding in number to those usually employed in harvester-rakes, which teeth are extended along the lower surface of the platform, in grooves therein, toward and near to the discharge side of said platform, and are then bent squarely upward through slots in the platform to a height above the same sufficient to correspond with the height of the bundle.

Toward the rear the rod C is held in place by the staple L. The rear end of said rod C is bent upward through a slot in the platform, inclining toward the discharge edge of the platform at such a point and in such a direction that the rake-head, near its attachment to the rod, will strike the same, bearing it down and passing mostly over it, the first point of such contact being at the proper distance to contain a bundle in a compressed form between said rake's teeth and those of the compressor, this upward portion of the rod C thus forming the eccentric-lever B.

We now place the metal spring D beneath the lever B, bearing it upward, together with the attached teeth, when not acted upon by the rake-head.

I represents the attachment to the platform for carrying the rake-hangings. H is the rake's sliding bar. M is a pin inserted in the extreme end of the rake-head, which, in the class of rake represented, holds the rake down firmly upon the platform when raking as it slides along the upper edge of the attachment I, and also holds the rake up in returning, by impinging against the inner surface of the attachment I, until the rake has passed beyond said attachment, when it falls by its weight.

J represents a conductor, preventing the lever B from rising too high with its teeth E E E E while the grain is discharged.

We give one form of grain-rake; but our machine may be operated by any form of automatic grain-rake working upon a rectilinear as distinguished from the circular platform.

The rake G, in passing over the platform A, strikes the lever B, (having at that point sufficiently compressed its freight of grain between the teeth of the compressor and its own,) which lever is thereby depressed, turning the rod C and lowering the teeth E E E E of the compressor below the upper surface of the platform.

The rake, passing on to the edge of the platform, at once discharges the bundle in a compact form, suitable for binding, avoiding the usual throw and scattered manner in which grain comes from the rake.

The pin M having now passed beyond the attachment I, the rake is raised by force of the spring D, operating upon the lever B, at which point the reverse motion of the rake occurs, and the teeth E E E E remain elevated until again depressed by the rake-head for the discharge of the bundle.

We claim—

1. The teeth E E E E, or their equivalent, working up and down at the discharge edge of the harvester-platform, in the manner and for the purposes stated.

2. The teeth E E E E, the lever B, the rod C, and the spring D, combined in the manner and for the purpose stated.

J. B. BOWEN.
CHARLES A. WHELAN.
CLEANTHUS A. REED.

Witnesses:
CHAS. T. WAKELEY,
GEORGE E. WOODWARD.